(12) United States Patent
Godden

(10) Patent No.: US 8,722,228 B2
(45) Date of Patent: May 13, 2014

(54) MOISTURE ACTIVATED BATTERY

(75) Inventor: Glenn Godden, Edmonds, WA (US)

(73) Assignee: Empire Technology Development LLC, Wilmington, DE (US)

( * ) Notice: Subject to any disclaimer, the term of this patent is extended or adjusted under 35 U.S.C. 154(b) by 90 days.

(21) Appl. No.: 13/260,446

(22) PCT Filed: Apr. 8, 2011

(86) PCT No.: PCT/US2011/031791
§ 371 (c)(1), (2), (4) Date: Sep. 26, 2011

(87) PCT Pub. No.: WO2012/138354
PCT Pub. Date: Oct. 11, 2012

(65) Prior Publication Data
US 2012/0258346 A1    Oct. 11, 2012

(51) Int. Cl.
*H01M 6/32* (2006.01)
*H01M 10/14* (2006.01)

(52) U.S. Cl.
USPC ............................. 429/118; 29/623.1; 29/730

(58) Field of Classification Search
None
See application file for complete search history.

(56) References Cited

U.S. PATENT DOCUMENTS

| | | | |
|---|---|---|---|
| 4,055,291 A * | 10/1977 | Peters | 228/108 |
| 4,461,403 A | 7/1984 | Prahs | |
| 4,746,221 A | 5/1988 | Okumura et al. | |
| 4,808,496 A | 2/1989 | Hope et al. | |
| 5,020,694 A | 6/1991 | Pettengill | |
| 5,569,368 A | 10/1996 | Larsky et al. | |
| 6,230,052 B1 | 5/2001 | Wolff et al. | |
| 6,383,536 B1 | 5/2002 | Palmer et al. | |
| 6,395,428 B1 | 5/2002 | Kezuka | |
| 6,416,800 B1 | 7/2002 | Weber et al. | |
| 7,008,722 B2 | 3/2006 | Huang | |
| 7,378,450 B2 | 5/2008 | Erkey et al. | |
| 7,476,221 B2 | 1/2009 | Sun et al. | |
| 7,476,222 B2 | 1/2009 | Sun et al. | |
| 7,477,939 B2 | 1/2009 | Sun et al. | |
| 7,477,941 B2 | 1/2009 | Sun et al. | |
| 7,477,947 B2 * | 1/2009 | Pines et al. | 607/134 |
| 7,632,533 B2 * | 12/2009 | Fotland et al. | 427/2.14 |
| 8,007,935 B2 | 8/2011 | He et al. | |
| 2002/0029973 A1 | 3/2002 | Maydan | |
| 2003/0102874 A1 | 6/2003 | Lane et al. | |

(Continued)

FOREIGN PATENT DOCUMENTS

AU    1305188 A    9/1989
AU    2002358277 A1    7/2003

(Continued)

OTHER PUBLICATIONS

International Search Report and Written Opinion for PCT Application No. PCT/US2011/031791, issued Jul. 7, 2011.

(Continued)

*Primary Examiner* — Ula C Ruddock
*Assistant Examiner* — Matthew Van Oudenaren
(74) *Attorney, Agent, or Firm* — Foley & Lardner LLP

(57) ABSTRACT

A battery includes a first battery. The first battery includes a first anode, a first cathode, and a dry electrolyte. The dry electrolyte is configured to be activated by a first biological fluid to electrically connect the first anode and the first cathode to generate an electrical current.

23 Claims, 11 Drawing Sheets

(56) References Cited

U.S. PATENT DOCUMENTS

| | | | |
|---|---|---|---|
| 2004/0070371 A1* | 4/2004 | Chern et al. | 320/136 |
| 2004/0071866 A1 | 4/2004 | Park et al. | |
| 2004/0141908 A1 | 7/2004 | Hara et al. | |
| 2004/0164096 A1 | 8/2004 | Engel et al. | |
| 2005/0013862 A1 | 1/2005 | Tobyn et al. | |
| 2005/0053830 A1 | 3/2005 | Akashi et al. | |
| 2005/0089548 A1* | 4/2005 | Virgalitto et al. | 424/440 |
| 2005/0233208 A1* | 10/2005 | Tang | 429/159 |
| 2006/0261823 A1* | 11/2006 | Parker | 324/713 |
| 2007/0059595 A1 | 3/2007 | Endo et al. | |
| 2007/0060862 A1 | 3/2007 | Sun et al. | |
| 2007/0111104 A1 | 5/2007 | Shibuya | |
| 2007/0123772 A1 | 5/2007 | Euliano et al. | |
| 2007/0142222 A1 | 6/2007 | Erkey et al. | |
| 2007/0236867 A1 | 10/2007 | Hossick-Schott et al. | |
| 2007/0282387 A1 | 12/2007 | Starkebaum | |
| 2007/0286929 A1 | 12/2007 | Andersen | |
| 2008/0009775 A1 | 1/2008 | Murison | |
| 2008/0050490 A1 | 2/2008 | Stalder et al. | |
| 2008/0171266 A1 | 7/2008 | Kato et al. | |
| 2008/0284599 A1 | 11/2008 | Zdeblick et al. | |
| 2009/0010998 A1 | 1/2009 | Marchitto et al. | |
| 2009/0136834 A1 | 5/2009 | Coowar et al. | |
| 2009/0270788 A1 | 10/2009 | Marenus et al. | |
| 2009/0286153 A1 | 11/2009 | He et al. | |
| 2009/0314336 A1 | 12/2009 | Nakatani et al. | |
| 2010/0055570 A1 | 3/2010 | Rodriguez | |
| 2010/0057147 A1 | 3/2010 | Fassih et al. | |
| 2010/0082088 A1 | 4/2010 | Fassih et al. | |
| 2010/0209515 A1 | 8/2010 | Chantalat et al. | |
| 2010/0239616 A1 | 9/2010 | Haezi et al. | |
| 2010/0298668 A1* | 11/2010 | Hafezi et al. | 600/302 |
| 2011/0052764 A1 | 3/2011 | Bulgin | |
| 2011/0065983 A1 | 3/2011 | Hafezi et al. | |
| 2011/0184482 A1 | 7/2011 | Eberman et al. | |
| 2012/0021014 A1 | 1/2012 | Chantalat et al. | |
| 2012/0276443 A1 | 11/2012 | Hatta et al. | |

FOREIGN PATENT DOCUMENTS

| | | |
|---|---|---|
| AU | 2008281632 A1 | 2/2009 |
| AU | 2009281876 A1 | 2/2010 |
| CA | 2734251 A1 | 2/2010 |
| CN | 1617765 A | 5/2005 |
| CN | 101174681 B | 5/2010 |
| CN | 101227001 B | 9/2011 |
| CN | 102176862 A | 9/2011 |
| EP | 1494807 A2 | 1/2005 |
| EP | 2173323 A2 | 4/2010 |
| EP | 1959023 B1 | 5/2010 |
| EP | 2313003 A2 | 4/2011 |
| EP | 2057703 B1 | 11/2013 |
| FI | 20065423 A | 12/2007 |
| GB | 2451503 A | 2/2009 |
| GB | 2455184 A | 6/2009 |
| JP | 2004134351 A | 4/2004 |
| JP | 2005209819 | 8/2005 |
| JP | 2006504508 A | 2/2006 |
| JP | 2007323878 | 12/2007 |
| JP | 4199811 B2 | 12/2008 |
| JP | 2012500055 A | 1/2012 |
| KR | 20040032421 A | 4/2004 |
| KR | 20110041563 A | 4/2011 |
| MX | PA04006324 A | 3/2005 |
| TW | 200930415 A | 7/2009 |
| WO | 03057367 A2 | 7/2003 |
| WO | WO 2005/004981 A2 | 1/2005 |
| WO | WO 2005/004983 A2 | 1/2005 |
| WO | 2005045977 A2 | 5/2005 |
| WO | WO 2007/147942 A1 | 12/2007 |
| WO | 2008052394 A1 | 5/2008 |
| WO | WO 2008/052136 A2 | 5/2008 |
| WO | 2009016350 A3 | 2/2009 |
| WO | WO 2009/016350 A2 | 2/2009 |
| WO | WO 2009/045720 A1 | 4/2009 |
| WO | 2010019778 A3 | 2/2010 |
| WO | WO 2010/111511 A2 | 9/2010 |
| WO | WO 2012/012509 A1 | 1/2012 |
| WO | 2012138352 A1 | 10/2012 |
| WO | 2012138354 A1 | 10/2012 |
| WO | 2012138361 A1 | 10/2012 |
| WO | 2012139100 A1 | 10/2012 |
| WO | 2012139107 A1 | 10/2012 |
| WO | 2012139109 A1 | 10/2012 |

OTHER PUBLICATIONS

International Search Report and Written Opinion for PCT Application No. PCT/US2011/031780, issued Sep. 15, 2011.
International Search Report and Written Opinion for PCT Application No. PCT/US2011/031783, issued Aug. 17, 2011.
International Search Report and Written Opinion for PCT Application No. PCT/US2011/039281, issued Sep. 22, 2011.
Kendrick, Mandy, "Tasting the Light: Device Lets the Blind "See" with Their Tongues," Scientific American, Aug. 13, 2009.
Ramsewak et al., "Bioactive N-Isobutylamides from the Flower Buds of *Spilanthes acmella*," Phytochemistry, 51 (1999) 729-732.
Benwick, Bonnie S., "Like a Taste That Tingles? Then This Bud's for You," The Washington Post, Oct. 3, 2007.
"Solid-State Batteries The Power of the Press,", The Economist, Jan. 27, 2011.
"From the Store Shelf to Home (and Beyond),", Ecoupled, Jan. 7, 2011, http://ecoupled.com/ces/from-the-store-shelf-to-home-and-beyond/.
Cass, Stephen, "Battery Storage Could Get a Huge Boost from Seaweed," Technology Review, Sep. 8, 2011.
International Search Report and Written Opinion for PCT/US2012/032753 issued Jul. 19, 2012, 13 pages.
International Search Report and Written Opinion for PCT/US2012/032731 issued Jun. 22, 2012, 13 pages.
International Search Report and Written Opinion for PCT/US2012/032757 issued May 31, 2012, 11 pages.
Office Action for U.S. Appl. No. 13/392,424, issued Jun. 10, 2013.
"Acmella oleracea," Wikipedia, accessed at http://web.archive.org/web/20100801072959/http://en.wikipedia.org/wiki/Acmella_oleracea, last modified on Jul. 14, 2010, pp. 1-2.
"Battery (electricity)," Wikipedia, accessed at http://web.archive.org/web/20100830123459/http://en.wikipedia.org/wiki/Battery_(electricity), Aug. 28, 2010, pp. 1-15.
"Edible Computer Chips," Nanotechnology, Skinny Science, accessed at http://web.archive.org/web/20110310140822/http://www.ediblecomputerchips.com/, Jan. 2009, pp. 1-8.
"Electrochemical Cell," Wikipedia, accessed at http://web.archive.org/web/20100219112124/http://en.wikipedia.org/wiki/Electrochemical_cell, accessed on Nov. 21, 2013, pp. 1-3.
"Pop Rocks," Wikipedia, accessed at http://web.archive.org/web/20110304100621/http://en.wikipedia.org/wiki/Pop_Rocks, last modified on Feb. 28, 2011, pp. 1-3.
Brinn, D., "Israeli project develops novel solution to dry mouth," accessed at http://www.israel21c.org/health/israeli-project-develops-novel-solution-to-dry-mouth, Feb. 27, 2005, pp. 1-3.
Just, N. et al., "Bold responses to trigeminal nerve stimulation," Magnetic Resonance Imaging, vol. 28, pp. 1143-1151 (2010).
Lawless, H.T. et al., "Metallic Taste from Electrical and Chemical Stimulation," Chemical Senses, vol. 30, No. 3, pp. 185-194 (2005).
Stevens, D.A. et al., "A Direct Comparison of the Taste of Electrical and Chemical Stimuli," Chemical Senses, vol. 33, pp. 405-413 (2008).
Notice of Allowance in U.S. Appl. No. 13/392,424 dtd Nov. 21, 2013 (10 pages).
Notice of Allowance in U.S. Appl. No. 13/392,424 dtd Jan. 30, 2014 (8 pages).

\* cited by examiner

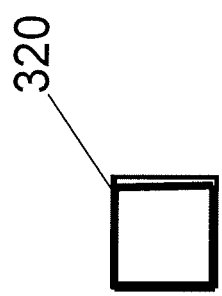
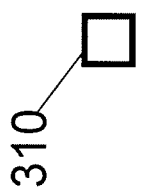
FIG. 3B
FIG. 3A

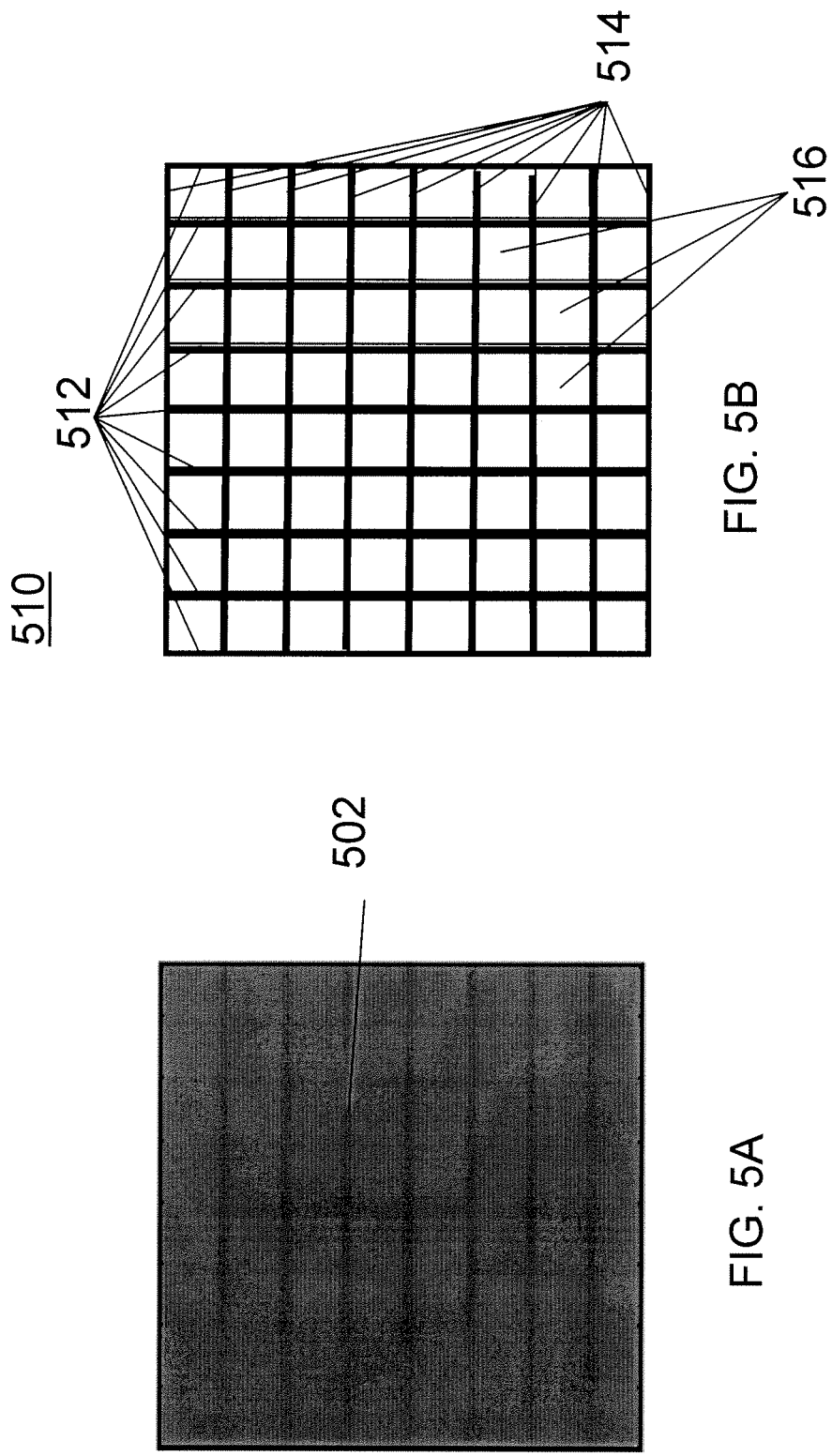

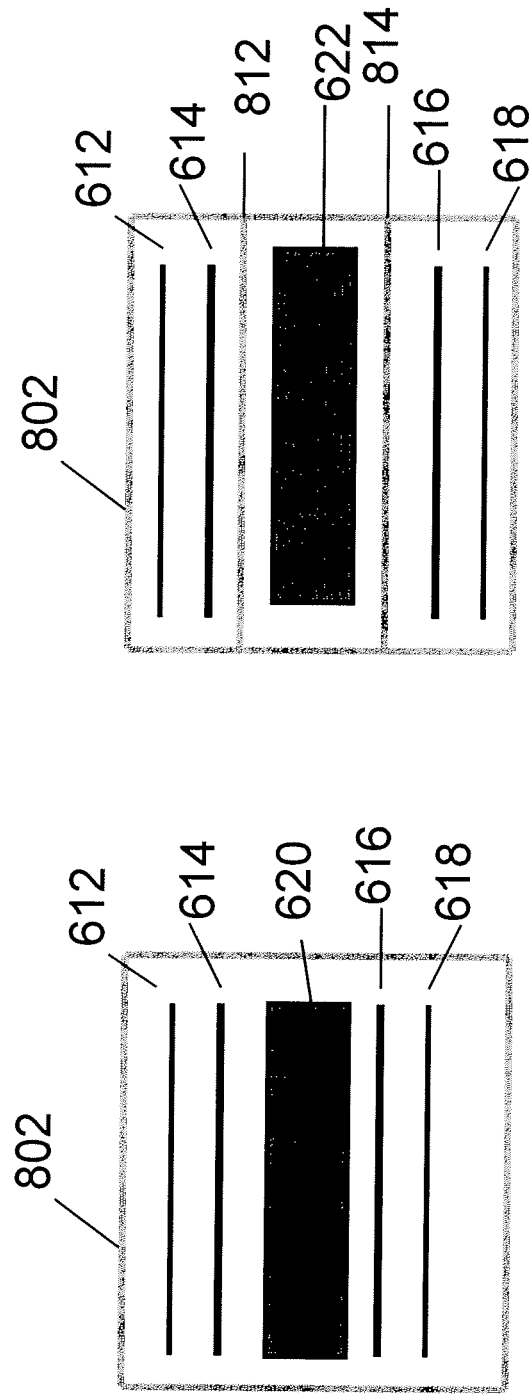

MOISTURE ACTIVATED BATTERY

CROSS-REFERENCE TO RELATED APPLICATIONS

This application is a U.S. national stage application claiming the benefit of International Application No. PCT/US2011/031791, filed on Apr. 8, 2011. The application is incorporated herein by reference in its entirety.

BACKGROUND

The following description is provided to assist the understanding of the reader. None of the information provided or references cited is admitted to be prior art.

A battery is an electro-chemical device that converts chemical energy into electrical energy. A battery generally includes an anode and a cathode, which are connected by an electrolyte. The electrolyte can be a dry electrolyte that is activated by moisture, or a wet electrolyte. When the battery is in operation, a redox reaction occurs. During the redox reaction, reduction occurs to cations at the cathode and oxidization occurs to anions at the anode. The battery has a terminal voltage, which is measured as the difference of voltage between the anode and cathode. A battery can be used as a power source to drive various circuits.

Tasting of foods in humans is accomplished using the 2,000 to 8,000 taste buds located on a typical human tongue. A taste bud is a cluster of around 50 to 100 taste receptor cells that respond to dissolved molecules and ions. Every taste bud has a pore that is open at the surface of the tongue or mouth wall. The pore allows molecules and ions to reach the receptor cells inside the taste bud. Saliva is a watery substance produced in the mouths of most animals and assists in tasting foods. Eating certain food can increase the production of saliva. Parts of food dissolved in saliva come into contact with the taste receptor cells.

SUMMARY

An illustrative apparatus includes a first battery. The first battery includes a first anode, a first cathode, and a dry electrolyte. The dry electrolyte is configured to be activated by a first biological fluid to electrically connect the first anode and the first cathode to generate an electrical current. In one embodiment, saliva activates the dry electrolyte. In another embodiment, sweat activates the dry electrolyte. In one embodiment, the first battery is between 5 millimeters and 10 millimeters in length and width.

In one embodiment, the first battery is configured to attach to a food product. In one embodiment, the food product is at least one of a cracker, a bread, a candy, or a preserve.

In one embodiment, the first anode is a food-grade anode and is made of at least one of copper, carbon, manganese dioxide, or iron. In another embodiment, the first cathode is a food-grade cathode and is made of at least one of zinc or nickel. In still another embodiment, the dry electrolyte is food-grade and is made of at least one of phosphoric acid, ascorbic acid, or salt.

In another embodiment, the apparatus includes a second battery in series with the first battery. The second battery includes a second food-grade anode, a second food-grade cathode, and a second dry electrolyte that is activated by the first biological fluid to electrically connect the second food-grade anode and the second food-grade cathode to generate an additional electrical current.

In another embodiment, the apparatus includes a non-conductive layer, such as wax, sucrose, or chocolate, that encapsulates the first battery. In one embodiment, the apparatus comprises a pill and the apparatus generates an electrical current in stomach tissue. In yet another embodiment, the non-conductive layer is waterproof.

In yet another embodiment, the apparatus includes a resistor, that can be made of carbon. In one embodiment, the resistor is operably connected to the first anode. In another embodiment, the resistor is operably connected to the first cathode.

In one embodiment, the electrical current increases production of saliva. In another embodiment, the electrical current increases secretion of saliva.

In still yet another embodiment, the apparatus includes a dissolvable strip. In one embodiment, the dissolvable strip includes a breath freshener and the electrical current reduces the flora of the mouth. In other embodiments, the dissolvable strip includes a teeth whitener and/or a drug. In yet other embodiment, the electrical current combats gum disease and/or enhances the absorption of a drug.

In yet another embodiment, the first battery is attached to a patch and the first anode and the first cathode are configured to contact skin when the patch is worn. In other embodiments, the electrical current is configured to have anti-bacterial properties, combat acne, stimulate a muscle, and prevent secretion of a bodily fluid, such as sweat. In another embodiment, the patch includes a fragrance. In yet another embodiment, the patch includes a drug and the electrical current enhances the absorption of the drug.

In still another embodiment, the first battery is attached to a pad. The first anode and first cathode are configured to contact skin. In one embodiment, the pad is a foot pad. In yet another embodiment, the electrical current is configured to reduce production of sweat.

In another embodiment, the electrical current is configured for sexual stimulation. In one embodiment, a dissolvable strip is configured to be inserted into a vagina.

An illustrative process for treating dry mouth includes administering a battery that includes an anode, a cathode, and a dry electrolyte. The dry electrolyte is activated through contact with a biological fluid to generate an electrical current.

In another illustrative method, a first anode and a first cathode are printed on a dry separator. The dry separator includes a dry electrolyte that is activated by a first biological fluid. The activated electrolyte electrically connects the first anode and the first cathode to generate an electrical current. In one embodiment, the first anode and the first cathode are printed on a same side of the dry separator. In an alternative embodiment, the first anode and the first cathode are printed on opposite sides of the dry separator. In one embodiment, the dry separator is divided into two or more batteries. Other embodiments include printing a resistor.

Another embodiment includes printing a second food-grade anode and a second food-grade cathode. The food-grade dry electrolyte separates the second food-grade anode and second food-grade cathode. The second food-grade anode and second-food grade cathode are in series with the first food-grade anode and the first food-grade cathode.

In one embodiment, the food-grade anode is printed as a grid. In another embodiment, the food-grade cathode is printed as a grid. Another embodiment includes printing the food-grade anode as a first set of parallel lines and printing the food-grade cathode as a second set of parallel lines. The first set of parallel lines is perpendicular to the second set of parallel lines.

Some embodiments include printing a liquid food-grade anode. Other embodiments include printing a liquid food-grade cathode.

In some embodiments, a laser jet printer is used to print the first anode and/or the first cathode. In alternative embodiments, a printing press is used to print the first anode and/or the first cathode.

Another illustrative apparatus includes a means for printing a first anode on a dry separator and a means for printing a first cathode on the dry separator. The dry separator includes a dry electrolyte configured to be activated by a biological fluid. Upon activation, the dry electrolyte is configured to electrically connect the first anode and the first cathode to generate an electrical current.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIGS. 3A and 3B illustrate mono-cell anodes or cathodes in accordance with an illustrative embodiment.

FIG. 5A illustrates an anode or cathode topology that includes a continuous layer in accordance with an illustrative embodiment.

FIG. 5B illustrates a grid anode or cathode topology in accordance with an illustrative embodiment.

FIG. 9A illustrates a battery encased in a non-conductive layer in accordance with an illustrative embodiment.

FIG. 9B illustrates a battery with a non-conductive layer between the anode and the dry electrolyte and between the cathode and the dry electrolyte in accordance with an illustrative embodiment.

DETAILED DESCRIPTION

Figure 1:
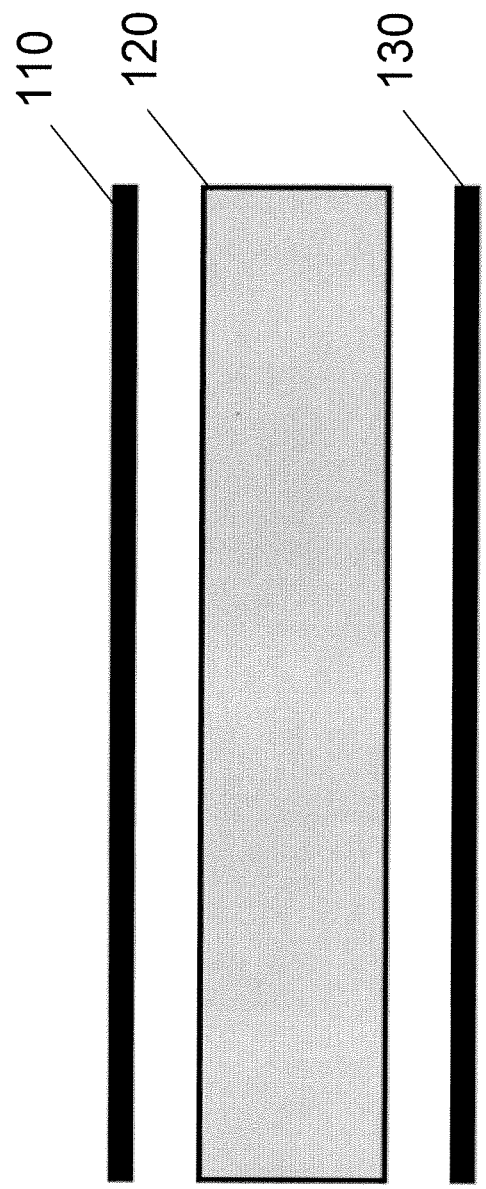
FIG. 1 illustrates a battery in accordance with an illustrative embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Described herein are illustrative methods and apparatuses relating to a battery that is configured to deliver an electrical current to living tissue or cells. The battery can be used with humans, animals, plants, etc. In one illustrative embodiment the battery is edible. In another illustrative embodiment, an apparatus includes a first battery and a food product, wherein the first battery is configured to attach to the food product. Non-limiting examples of food products may include, but are not limited to, a cracker, bread, a candy, a preserve, etc. The anodes, cathodes, and electrolytes may be composed of food grade materials that are safe for consumption. Non-limiting examples of food-grade anodes include copper, carbon, manganese dioxide, and iron. The food-grade cathode may be, but is not limited to, zinc or nickel. Non-limiting examples of a food-grade electrolyte include phosphoric acid, ascorbic acid, and salt. In one illustrative configuration, the dry electrolyte is configured to be activated by a biological fluid such as saliva. A biological fluid is a liquid that originates from inside the bodies of living organisms, and can be excreted or secreted from an organism. Upon activation, an electrical current produces a noticeable sensation. For example, when a cracker containing a battery is eaten, saliva activates the battery, which in turn generates a current that may be felt, for example, in a mouth, gums, lips, etc.

The voltage of an illustrative battery may be increased or decreased in various ways. One such example is by using multiple batteries combined in series. For example, a second battery including a food-grade anode, a food-grade cathode, and a food-grade dry electrolyte may be configured to be in series with the first battery. The dry electrolyte of the second battery is configured to be activated by the biological fluid to electrically connect the food-grade anode and the food-grade cathode of the second battery to generate an additional electrical voltage. One or more additional batteries may similarly be connected in series with the first and second batteries to generate additional electrical voltage.

In one configuration, a width of the batteries may be between 5 millimeters (mm) and 10 mm, and a length of the batteries may be between 5 mm and 10 mm. In one configuration, a thickness of the batteries may be 10 mm. As described in more detail below, different lengths, widths, and/or thicknesses may be used in alternative embodiments. In an illustrative embodiment, the thickness of the batteries may be increased or decreased by controlling the thickness of the anode, the thickness of the cathode, and/or the thickness of the dry electrolyte that make up the each battery.

In another illustrative embodiment, a non-conductive layer is used to separate components of the battery from moisture. In one configuration, the first battery may be encapsulated in a non-conductive layer. The non-conductive layer may be waterproof and may be composed of, but is not limited to, wax, sucrose, and chocolate. In another illustrative configuration, a non-conductive layer may be used to separate the anode from the electrolyte or food product. Similarly, another non-conductive layer may be used to separate the cathode from the electrolyte or the food product in which the battery is placed. In yet another illustrative embodiment, the battery may also include a resistor. The resistor may be operably connected to either the anode or the cathode of the battery. Additionally, the battery may include multiple resistors, which are operably connected to the anode, the cathode, or both. The resistor may also be combined with the dry electrolyte. A resistor may be composed of, but is not limited to, carbon.

In another illustrative embodiment, a food-grade anode is printed on a dry separator. A food-grade cathode may also be printed on the dry separator. The dry separator may include a food-grade dry electrolyte. The anode and/or cathode may be printed as a grid. In another configuration, the anode is printed as a first set of parallel lines. The cathode may also be printed as a second set of parallel lines that are perpendicular to the first set of parallel lines. The anode and cathode may also be printed in other various formations, such as, but not limited to, spirals, interspersed fingers, mono-cells, foldable mono-cells, etc. Foldable mono-cells may refer to multiple cells that are foldable to create batteries that are in series with one another. Various illustrative configurations of print formations are illustrated and described with reference to the figures. In one embodiment, the anode and cathode may be printed on the same side of the dry separator. In another configuration, the anode and the cathode may be printed on opposite sides of the dry electrolyte. Printing of the anode and cathode may include, but is not limited to, using a printer, such as an ink jet printer or a wax based printer, or using a printing press. Resistors may also be printed on the dry separator in a similar manner as the anode and cathode.

Multiple batteries may also be printed on a dry separator. Multiple anodes and corresponding multiple cathodes may be printed on the dry separator. The multiple batteries may then be separated by dividing the multiple anodes and cathodes into two or more batteries, with each battery including at least one anode and one cathode. The batteries can be configured to be in series or in parallel with one another to increase voltage or current.

Other applications of a battery according to illustrative embodiments are also described herein. For example, illustrative embodiments include using a battery to increase saliva production, to treat dry mouth, to treat canker sores, to freshen breath, for sexual stimulation, as an antiseptic, as an antiperspirant, and to help deliver a drug to a subject. These and other illustrative embodiments are described in greater detail below.

It will be understood that the above embodiments and configurations are given as illustrative examples only and that other configurations of the battery will be apparent to those of skill in the art in light of the present disclosure. Additional details and embodiments are described with reference to the figures. FIG. 1 illustrates a battery 100 in accordance with an illustrative embodiment. The battery 100 includes an anode 110, a cathode 130, and a dry electrolyte 120. The anode 110, cathode 130, and dry electrolyte 120 may be made of food-grade products. As discussed in further detail below, a battery including food-grade products may be incorporated into various types of food products, such as, but not limited to, snack foods, prepared foods, candies, condiments, spices, and salad toppings. Specific examples of food products that the battery 100 may be incorporated into include, but are not limited to, a cracker, bread, a candy, a preserve, a potato chip, a gum, etc. Various food-grade products can be used for the anode 110, cathode 130, and the dry electrolyte 120. For example, food-grade products that may make up the anode include, but are not limited to, copper, carbon, manganese dioxide, or iron. The cathode 130 may be made of, but is not limited to, zinc or nickel. Phosphoric acid, ascorbic acid, or salt such as NaCl are non-limiting examples of food-grade products that may make up the dry electrolyte 120.

In one embodiment, the anode 110 and cathode 120 may be made of food-grade products that are vitamins and/or minerals. As such, the battery 100 may deliver such vitamins and/or minerals. For example, the battery 100 may include anodes and cathodes that may be made of, but are not limited to, copper, zinc, nickel, or iron.

In the illustrated embodiment of FIG. 1, the dry electrolyte 120 separates the anode 110 and the cathode 130. Prior to the addition of moisture such as a biological fluid, the dry electrolyte 120 is inert and prohibits the flow of anions and cations. The dry electrolyte 120 is activated when exposed to moisture. Upon activation, anions are able to migrate to the anode 110, and cations are able to move toward the cathode 130 as known to those of skill in the art. Biological fluids are sources of moisture which may activate the dry electrolyte 120. An example of an activating biological fluid includes, but is not limited to, saliva, aqueous humour, blood serum, breast milk, cerebrospinal fluid, cerumen, endolymph, gastric juices, mucus, peritoneal fluid, pleural fluid, subum, semen, sweat, tears, vaginal secretion, vomit, and/or urine.

Figure 2:
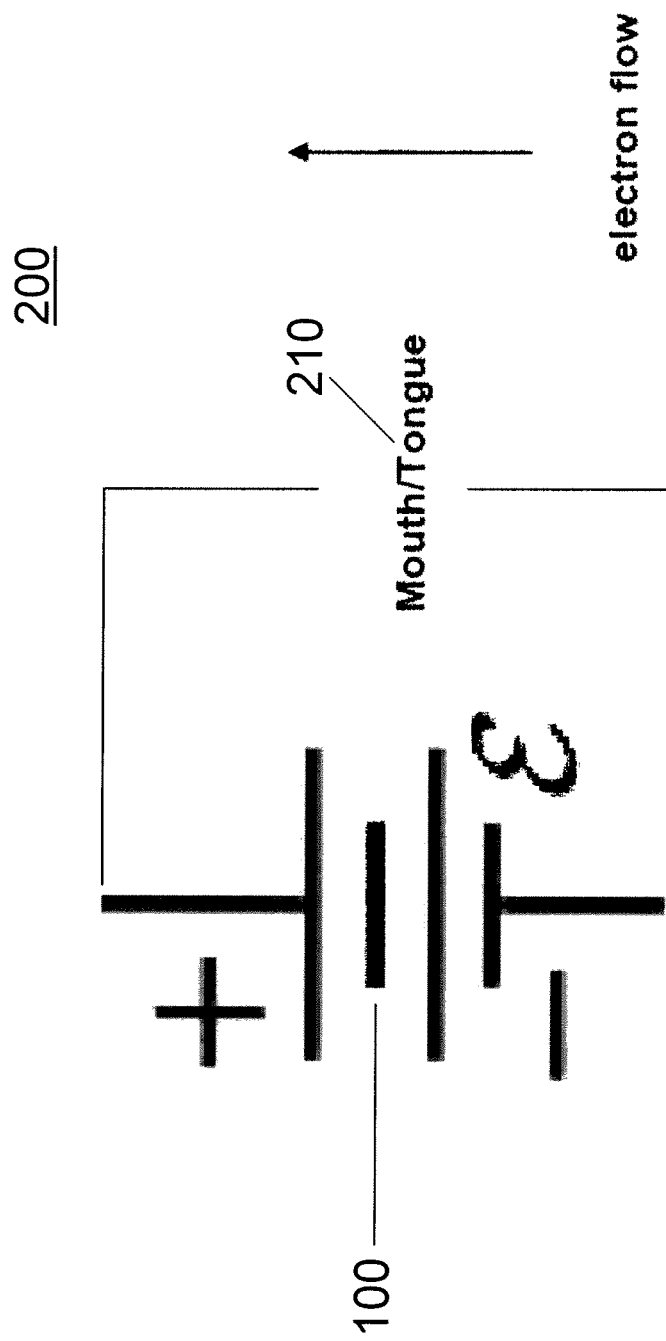
FIG. 2 illustrates an electrical circuit formed in a mouth with the battery in accordance with an illustrative embodiment.

When placed in a mouth, the battery 100 is exposed to saliva, which activates the dry electrolyte 120. FIG. 2 illustrates an electrical circuit 200 that includes an activated battery 100 and a mouth 210 in which the battery 100 is activated. For example, the tongue may connect the anode 110 and cathode 130, thus creating the circuit 200. The circuit 200, however, is not limited to being formed solely with the tongue. Rather, the circuit 200 may be formed with one or more parts of the mouth, such as, but not limited to, the tongue, teeth, gums, the walls of the mouth, and/or fluid associated with the mouth. Once the circuit 200 is formed, the battery 100 provides a direct current power source that generates electrical current that flows through the circuit 200. In an illustrative embodiment, the current is detectable by a user as a tingling of the parts of the mouth 210 that form the circuit 200.

In another embodiment, the battery can be activated by another biological fluid outside of the mouth. For example, in one embodiment one or more batteries 100 can be embedded in a patch or bandage that can be affixed to a subject. The patch can include the anode 110, cathode 130, and dry electrolyte 120, and can be attached to skin. Accordingly, the patch can be worn. In another related embodiment, the dry electrolyte 120, the anode 110 and cathode 130 can be printed or attached to one side of the patch. Moisture from the skin can be used to activate the battery 100. In one embodiment, the patch traps moisture from the skin to facilitate the activation of the battery. In this embodiment, the anode 110 and the cathode 130 can be in contact with skin when the patch is affixed to the subject. Upon activation of the battery 100, a current can be used to effect delivery/absorption of a drug, to combat bacteria such as the bacteria that causes acne, to stimulate muscles, etc. In addition, the current can also have an anti-bacterial effect. The current can also have an anti-viral effect and can be used to in the treatment of sores of the mouth, such as, but not limited to, canker sores.

In another embodiment, one or more batteries 100 contained in a patch can be used as an antiperspirant and/or deodorant. For example, the anode 110 can include an aluminium complex, the cathode 130 can include carbon, and the dry electrolyte 120 can be salt. Illustrative aluminium complexes include, but are not limited to, aluminum chloride, aluminium chlorohydrate, and aluminium-zirconium compounds. In such an embodiment, sweat can be used to activate the battery 100. The current produced by the battery 100 through a subject's skin can aid in the iontophoretic delivery of the aluminum-based complexes. Although not intending to be limited by theory, the aluminium-based complexes may aid in the formation of plugs in sweat glands, and thus, can help prevent perspiration. The aluminium-based complexes may also interact with keratin fibrils in sweat ducts and form a physical plug that prevents sweat from reaching the surface of skin. This patch can also include fragrant materials. Accordingly, a patch can be used to combat excessive sweating in an area covered by the patch.

Another embodiment is a battery 100 that is not affixed to a subject, but is in contact with the subject. For example, one or more batteries 100 may be attached to or printed on a pad. The pad can include the anode 110, cathode 130, and dry electrolyte 120, and can be placed in contact with skin. In an illustrative embodiment, the pad can be worn in a shoe. Moisture from a subject's foot can activate the battery 100, and the anode 110 and the cathode 130 in contact with the foot can cause an electrical current to flow through a subject's foot. A current created by an activated battery 100 may have an anti-bacterial effect and may also decrease sweating. Accordingly, in an illustrative embodiment, a foot pad that includes a battery 100 can be used to combat foot odors.

In another illustrative embodiment, a dissolvable strip can include a battery 100. The strip can include other components such that the strip can be used as a breath freshener, as a teeth whitener, to deliver medicine such as antacid medicine, cold medicine, nicotine, or anti-gas medicine, as an energy supplement, or for sexual stimulation. In each of these embodiments, an activated battery 100 can provide an electrical current that enhances the performance of the strip for its intended purpose. For instance, the electrical current may facilitate the delivery of a drug contained within the strip or taken simultaneously with the activation of the strip. In another embodiment, the current from the activated battery 100 may impede the flora of the mouth, and therefore, helps protect against cavities and/or gum disease. In addition, the battery may also increase the production and secretion of saliva, which also helps protect against cavities and/or gum disease.

The battery 100 is not limited to being activated by a biological fluid within the mouth. For instance, the battery 100 can be used for sexual stimulation. In an illustrative embodiment, one or more batteries 100 can be attached to or printed on a thin dissolving film. The battery can be inserted into any orifice, such as a vagina or a mouth, and activated with any bodily fluid contained within the orifice. Alternatively, the battery 100 can be placed upon a penis, and activated when the battery 100 comes into contact with any biological fluid. The activated battery can produce an electrical current that flows through a subject's genitals to provide sexual stimulation. In addition, the effects of the activated battery are transferable from one person to another. For instance, an activated battery can be transferred between two individuals through kissing, fellatio, cunnilingus, sexual intercourse, etc. The electrical current can result in heightened sexual stimulation.

In some embodiments, the battery 100 (FIG. 1) is activated upon being placed in a mouth, which may expose the battery 100 to chewing and maceration. The chewing and maceration may increase the amount of saliva that comes into contact with the dry electrolyte 120. While such chewing and maceration may help activate the dry electrolyte 120, it may also eventually destroy the battery 100. In some configurations, the battery 100 may remain intact for between approximately 5 and 60 seconds while being chewed within the mouth. As described in more detail below, other configurations may be utilized that allow the battery to survive either a shorter or longer period of time.

A number of parameters may influence the properties of the battery 100. For example, the terminal voltage of the battery 100, the amperage of the circuit 200 (FIG. 2), and the lifespan of the battery 100 may be configured based upon the properties of the battery 100. The materials that make up the anode 110 and cathode 130 provide properties that affect the voltage of the battery 100. Table 1, which is shown below, illustrates non-limiting examples of different anodes 110 and cathodes 130 and illustrative resulting voltages of the battery 100 using these materials. In these examples, the dry electrolyte 120 used was salt or citric acid and the battery 100 was embedded on a thin slice of Russet potato. Distilled water was used to activate the dry electrolyte. The voltage was measured using a Fluke 8060 digital multimeter. Edible batteries 100 with higher voltages result in a higher current that flows through the circuit 200.

TABLE 1

| Anode | Cathode | Measured Voltage |
| --- | --- | --- |
| Zinc | Copper | ~830 mVDC |
| Zinc | Carbon | ~1500 mVDC |
| Zinc | Manganese Dioxide | ~1500 mVDC |
| Nickel | Iron | ~1200 mVDC |

The size of the battery 100 is another property that may be used to configure the battery 100. Specifically, the size of the battery 100 may be used to configure how long the battery 100 is operable. Generally, the larger the battery 100 the longer the battery will remain active within the mouth. FIG. 3A illustrates a 5 mm by 5 mm square mono-cell 310 of an anode 110 or a cathode 130, while, FIG. 3B illustrates a larger 10 mm by 10 mm square mono-cell 320 of an anode 110 or a cathode 130 in accordance with illustrative embodiments. A battery 100 of these sizes may remain active between 5 and 60 seconds within the mouth. The time the battery is active may be increased by using larger anodes and cathodes. Larger anodes and cathodes may take a longer time to be destroyed by chewing and maceration, resulting in a longer active time of the battery 100. The battery 100 may be larger, including but not limited to being 25 mm, 50 mm, 1 cm, 10 cm, etc. in size. The battery 100 may also be smaller, which may result in the active time of the battery 100 being reduced. For example, the size of the battery may be, but is not limited to being, 1 micrometer, 0.1 mm, 0.5 mm, 1 mm, 3 mm, etc.

FIGS. 3A and 3B illustrate square-shaped anodes and cathodes. The anodes and cathodes, however, are not limited to being square in shape. The anodes and cathodes may also be, but are not limited to being, rectangles, circles, triangles, quadrangles, trapezoids, octagons, etc. In addition, the anode 110 may be of a different shape and/or size than the cathode 120. For instance, non-limiting examples of possible configurations include a 5 mm by 5 mm square anode and a 10 mm by 10 mm square cathode; a 10 mm by 10 mm square anode and a 5 mm radius circular cathode; and a 25 mm radius circular anode and a 5 mm by 10 mm rectangular cathode.

The terminal voltage of the battery 100, the current of the circuit 200, and lifespan of the battery 100 may be also be controlled by using multiple batteries. The battery 100 may be relatively small compared to a food product or other component such as but not limited to a patch or pad that integrates the battery. In these configurations, multiple batteries may be integrated into the component. For example, two, three, four, or more batteries may be integrated into the component. In one illustrative embodiment, multiple independent edible batteries may be integrated into a single side of a food product such as a cracker or a slice of bread. Including multiple batteries generally increases the lifespan of the batteries compared with a single battery 100 because multiple batteries may take longer to be depleted or destroyed by maceration and chewing. In addition to multiple batteries on a single side of a food product, multiple batteries may be added to various different sides of the food product. In one configuration, one or more edible batteries are integrated with a food product on a top surface, and one or more edible batteries are integrated on a bottom surface of the food product. Additionally, one or more edible batteries 100 may be integrated on any surface of the food product. Further, the multiple batteries are not limited to having the same configuration. For instance, based upon the typical chewing and maceration properties, a battery 100 on the top surface may be configured to remain active longer compared to a battery 100 on the bottom surface.

Figure 4:
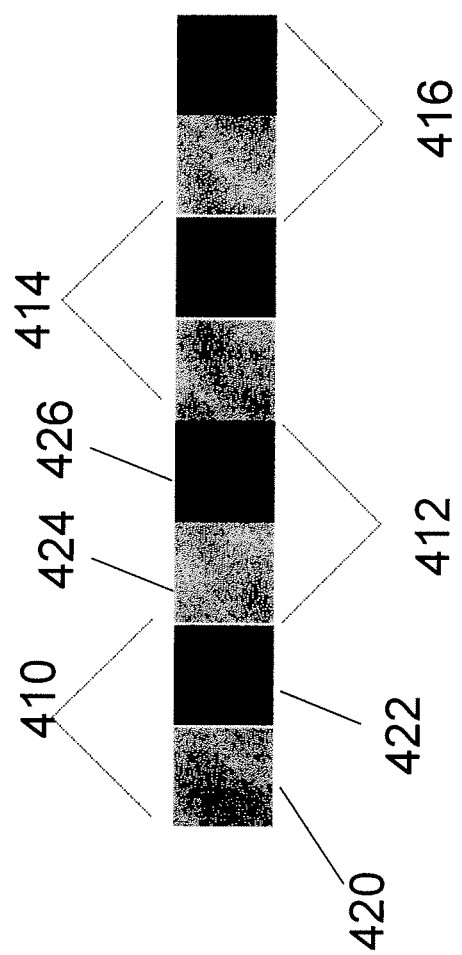
FIG. 4 illustrates an anode and cathode topology that includes four edible batteries in accordance with an illustrative embodiment.

In another configuration, the multiple batteries may be configured to be in series with one another. FIG. 4 illustrates four 5 mm by 5 mm two-cell batteries 410, 412, 414, and 416 that may be folded such that each of the four batteries is in series with one another. Each battery includes an anode 420 and a cathode 422. To connect the four batteries in series, the cathode 422 is folded on top of the anode 420. A dry electrolyte is inserted between the cathode 422 and anode 420, to separate the cathode 422 and anode 420. This folding creates the first two-cell battery 410. The folding process is repeated for an anode 424 and a cathode 426 to create the second two-cell battery 412. The battery 410 and battery 412 are connected in series by connecting the cathode 422 of the first battery 410 with the anode 424 of the second battery. The folding process is repeated to create batteries 414 and 416, which may then be connected in series with one another and battery 412. The order of the anode 420 and cathode 422 are not limited by FIG. 4, and may be reversed such that the cathode 422 is followed by the anode 420. Batteries connected in series increase the voltage of the system of batteries. The multiple batteries 410, 412, 414, and 416 do not have to be folded to create the series. For example the four batteries may be four independent batteries whose anodes and cathodes are connected to be in series. The process by which the batteries' voltage is increased by connecting batteries in series is well known to those of skill in the art.

The speed at which the battery is activated is another property that may be controlled based upon the properties of the battery 100. The topology of the anode and cathode may impact the speed in which the battery is activated. In one configuration, illustrated in FIG. 5A, the anode or cathode may be a continuous layer 502 that covers a side of the dry electrolyte. In this configuration, the dry electrolyte is located between the anode 110 and the cathode 130 and is therefore, not exposed. The anode 110 and the cathode 130 provide a barrier to any moisture reaching the dry electrolyte 120. The anode 110 and the cathode 130 may not be waterproof, such that moisture may penetrate the dry electrolyte through the anode 110 or cathode 130. In such configurations, the anode 110 and cathode 130 may delay the activation of the battery 100, as the moisture must first penetrate the anode 110 and/or cathode 130 before the dry electrolyte 120 may be activated. In this embodiment, the time that it takes for the battery to become active is increased by the protective barrier created by the anode 110 and the cathode 130.

Figure 5D:
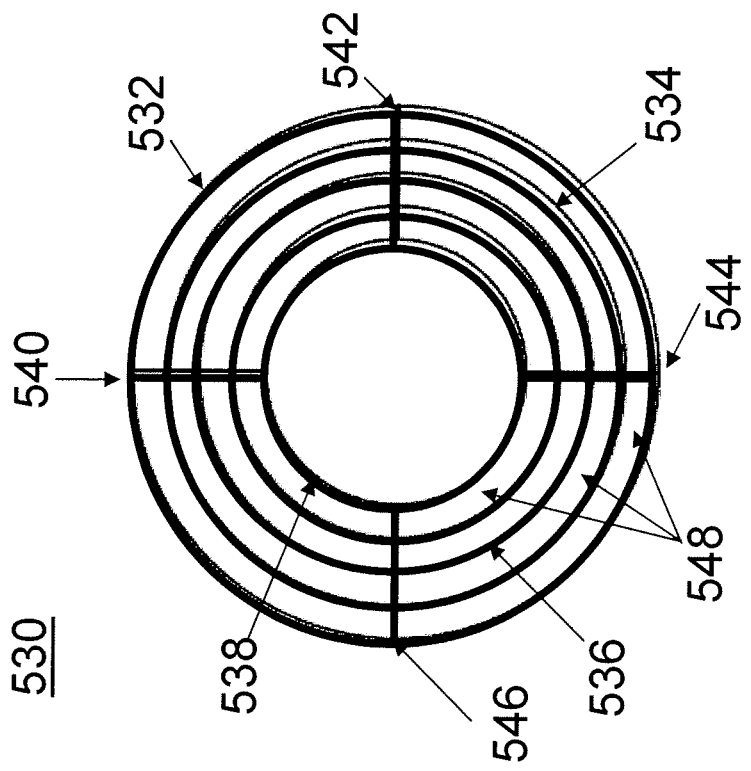
FIG. 5D illustrates a concentric circle anode or cathode topology in accordance with an illustrative embodiment.
Figure 5C:
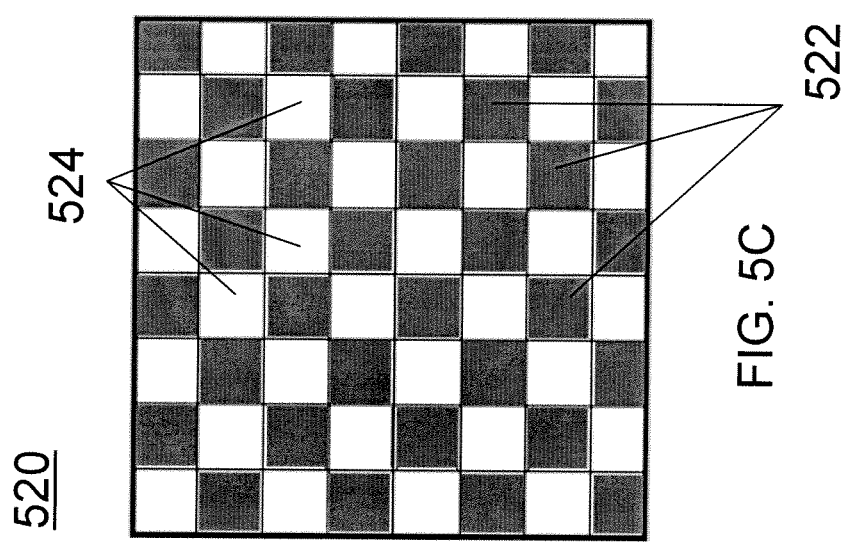
FIG. 5C illustrates a checker board anode or cathode topology in accordance with an illustrative embodiment.

To allow activation of the battery 100 to occur more rapidly, the dry electrolyte 120 may be exposed and not completely covered by the anode 110 and/or cathode 130. Exposing the dry electrolyte 120 allows the biological fluid to come into contact with and activate the dry electrolyte 120 without chewing or breaking through any coating covering the dry electrolyte 120. FIG. 5B illustrates one such example of a topology that allows the dry electrolyte 120 to be exposed. The anode or cathode may be formed by a series of vertical lines 512 and horizontal lines 514 to form a grid pattern 510. Spaces 516 between the lines 512 and 514 (e.g., the anodes and cathodes), allows the dry electrolyte to be exposed. Other variations to the grid pattern 510 may be used. For example, a grid pattern may include a number of rectangles instead of squares. FIG. 5C illustrates a checkerboard pattern 520. The anode or cathode may cover a number of spaces 522, while leaving a number of spaces 524 uncovered. The number of spaces covered by the anode or cathode is not limited to the configuration of the checkerboard pattern 520. Fewer or more spaces may be covered by the anode or the cathode. Increasing the number of anodes and cathodes present typically increases the lifespan of the battery, due to the battery 100 surviving the chewing and maceration processor longer. In addition, portions of the dry electrolyte 120 are exposed through the spaces 524 and therefore, the time to activate the battery is less than if the anode or cathode covered the entire dry electrolyte as illustrated in FIG. 5A.

The topology of the anode and the cathode are not limited to being patterns of quadrangles. FIG. 5D illustrates a circular topology 530. The anode or cathode may be formed by concentric circles 532, 534, 536, and 538 and four lines 540, 542, 544, and 546, that connect the circles. Space 548 between the circles 532, 534, 536, and 538 allows the dry electrolyte to be exposed. As the dry electrolyte is exposed, the biological fluid can activate the battery upon contact with the dry electrolyte. The anode and the cathode may also fill in one or more of the spaces 524 to increase the amount of anode and cathode present in the battery, and thus, increase the amount of time the battery is active.

In some configurations, the topology of the anode may differ from the topology of the cathode. For instance, an anode that dissolves quickly may have the topology illustrated in FIG. 5A, while the cathode may have the topology illustrated in FIG. 5B to allow the dry electrolyte to be exposed to the biological fluid, therefore allowing the battery 100 to be activated quicker than if the topology of 5A was used for the cathode. The topologies of the anode and cathode may be any of the disclosed examples and may differ from one another.

FIGS. 5A, 5B, 5C, and 5D illustrate various topologies for anodes and cathodes located on different sides of the dry electrolyte. The anode and cathode, however, may also be located on the same side of the dry electrolyte. FIG. 5E illustrates one such example. An anode 552 is located next to a cathode 554. The anode 552 and the cathode 554 form fingers 556 that are separated from one another but are interspaced. Space between the fingers 556 allows the dry electrolyte to be exposed, and separates the anode 552 and the cathode 554 to allow the battery to become activated upon exposure to moisture. The number of fingers 556 may be increased or decreased. For example, the number of fingers included in a finger pattern 550 may include, but is not limited to, 3, 6, 10, 12, etc. fingers.

Figure 5F:
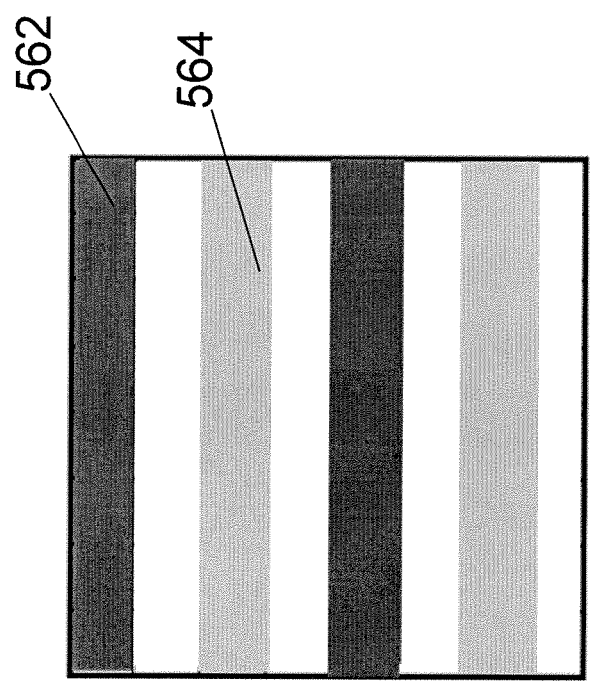
FIG. 5F illustrates a row anode and cathode topology in accordance with an illustrative embodiment.
Figure 5E:
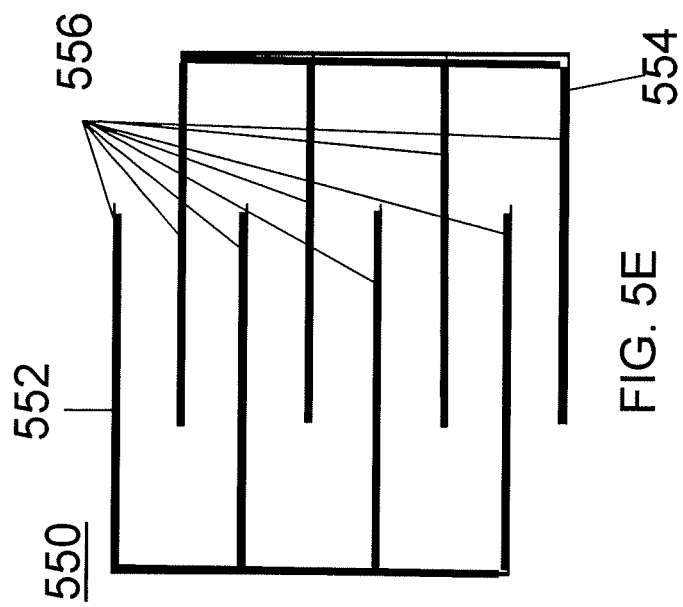
FIG. 5E illustrates a finger grid anode and cathode topology in accordance with an illustrative embodiment.

FIG. 5F illustrates another non-limiting example of alternating rows of an anode 562 and a cathode 564 that may be located on one side of a dry electrolyte. Space between the rows allows a dry electrolyte to be exposed, and separates the anode 562 and the cathode 564. In another non-limiting example, the anode may be a first set of parallel lines and the cathode may be a second set of parallel lines that are perpendicular to the first set of parallel lines, forming a grid similar to the grid illustrated in FIG. 5B.

Figure 6B:
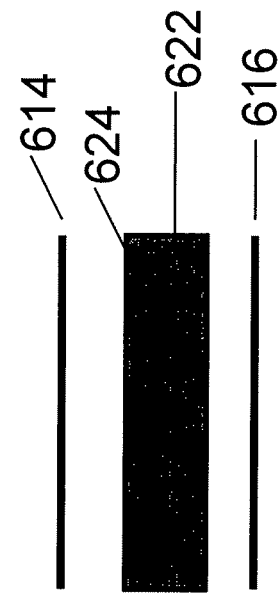
FIG. 6B illustrates resistors combined with the dry electrolyte in accordance with an illustrative embodiment.
Figure 6A:
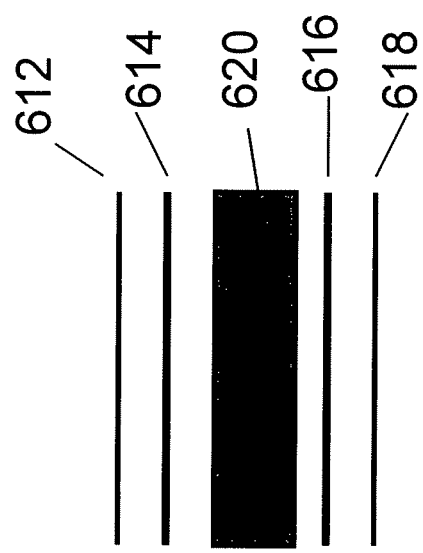
FIG. 6A illustrates resistors in series with the anode and cathode in accordance with an illustrative embodiment.

In one embodiment, current of the circuit 200 may be reduced by adding resistance to the battery 100. FIG. 6A illustrates one such configuration, where a resistor 612 may be in series with an anode 614 and another resistor 618 may be added in series with the cathode 616. The circuit 200 is not required to include both resistors 612 and 618, but instead, may contain only one of the resistors 612 and 618. The resistors 612 and 618 may be made of carbon. The resistors 612 and 618 may also be composed of, but are not limited to, salt and nickel chromium. The addition of resistors 612 and 618 may increase the resistance of the circuit 200 to a total of 17 kilo-ohms to 20 kilo-ohms in one embodiment. The amount of resistance may be varied by increasing the amount of resistance material used and the thickness of the resistors 612 and 618. Other resistance amounts may be achieved, such as, but not limited to, 1 kilo-ohms, 5 kilo-ohms, 25 kilo-ohms, 50 kilo-ohms, etc. The added resistance results in a reduction in the amperage of the circuit 200. FIG. 6B illustrates another configuration, where resistor material 622, illustrated by dashed lines, may be combined with the dry electrolyte 624. The addition of resistor material 622 may increase the resistance of the circuit 200 by various amounts including, but not limited to, 1 kilo-ohms, 5 kilo-ohms, 15 kilo-ohms, 25 kilo-ohms, etc. The amount of resistance in this configuration may be determined by the amount of resistance material 622 that is combined with the dry electrolyte 624. The resistance material 622 may also be combined with either the anode or the cathode to increase the resistance of the circuit 200.

A battery may be made in a number of ways. In one embodiment, an inkjet printer is used to print an anode and a cathode onto a dry separator that is impregnated with the dry electrolyte. Rice paper is one non-limiting example of a dry separator than may be impregnated with the dry electrolyte. Dehydrated potato is another example of a dry separator that inherently contains phosphoric acid and acts as the dry electrolyte. The dry separator may also be, but is not limited to, wheat, sugar, and algae. The dry separator may also be a food product, such as a cracker or potato chip. The anode and cathode may be a food-grade liquid and, prior to printing, may be contained in an inkjet cartridge that corresponds with the inkjet printer. A food-grade liquid anode, cathode, electrolyte, and resistor can be made by suspending the base material of the anode, cathode, electrolyte, or resistor in a 25% to 50% saturated solution of distilled water and sodium alginate. In an alternative embodiment, a different saturated solution and/or concentration may be used. This solution can be heated to increase the rate of dissolution and the amount of base material dissolved into the solution. The solution can be heated to various temperatures based upon the base material such as, but not limited to, about 100° F., about 150° F., about 175° F., and 250° F. After cooling, the solution can be injected into ink jet cartridges.

An inkjet printer having a resolution of 1200 dots per square inch may be used to print the anode and the cathode. Other resolutions may be used to print the anode and the cathode such as, but not limited to, 600, 720, 1440, etc. dots per square inch. Once printed on the dry separator, the anode and cathode may be cured using ultra-violet light. The uses and components of an inkjet printer are well known to those of skill in the art.

Figure 7:
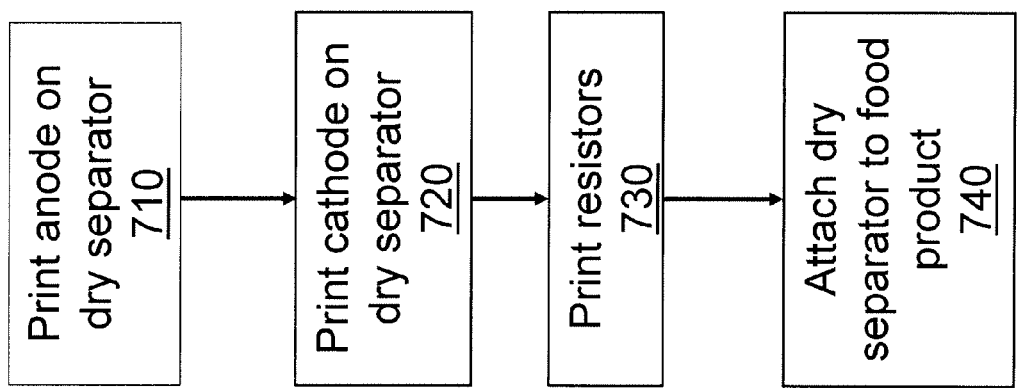
FIG. 7 is a flow diagram depicting operations performed in printing a battery in accordance with an illustrative embodiment.

FIG. 7 is a flow diagram depicting operations performed in printing a battery 100. Additional, fewer, and/or different operations may be performed depending on the particular implementation. One or more of the operations may be performed in a different order depending on the particular implementation. In an operation 710, an anode is printed on a dry separator. The dry separator may be a food product, such as a cracker, or may be a separator that is configured to be integrated into a food product. An anode may be printed as any of the described topologies, such as any of those illustrated in FIG. 5A, 5B, 5C, 5D, 5E, or 5F. In an operation 720, a cathode is printed on the dry separator. The cathode may also be printed using any of the described topologies. The dry separator includes a dry electrolyte that is activated by a biological fluid, such as, but not limited to, saliva. Upon activation, the anode and the cathode become electrically connected, and the battery 100 may generate an electrical current. The order in which the anode and cathode are printed may be reversed, such that the cathode is printed first, followed by the anode. The anode and cathode may be printed on the same side or different sides of the dry separator. In an optional operation 730, resistors may be printed. Resistors may be attached to the anode or cathode by being printed on top of the anode 110 or cathode 130. Again, the order in which the anode, cathode, and resistors are printed may vary. For example, any resistors may be printed first, followed by the printing of the anode and cathode. In an optional operation 740, the dry separator is attached to a food product. For example, the dry separator can be attached to a potato chip or cracker using wax. The dry separator can also be embedded in or throughout a jam or candy, for example. If the food product is not a dry food product, the dry separator can be embedded in a non-conductive coating, as described in more detail below. Operation 740 may not be performed if the dry separator includes the food product.

Using the process described in FIG. 7, multiple batteries may be printed on a single dry separator. The dry separator may then be divided into two or more batteries. As a non-limiting example, multiple anodes of any topology may be printed onto a dry separator. Corresponding multiple cathodes may also be printed onto the dry separator. The dry separator, therefore, contains multiple batteries. Each battery includes a corresponding pair of an anode and a cathode. The dry separator may be divided or cut into two or more batteries. The processes and tools used to divide or cut a printed surface are well known to those of skill in the art.

Anodes and cathodes may be printed using technologies other than ink jet printers. For example, a printing press may be used to press the anode and cathode onto the dry separator. The processes and tools used to print using a printing press are well known to those of skill in the art and are not described in detail herein. The process of making a battery 100 is amenable to any technology well known in the art capable of applying a liquid onto a sheet of material.

A battery 100 is introduced into a mouth by being incorporated into a food product. One example of a food that a battery 100 may be incorporated into is a cracker. In one embodiment, a complete battery 100 is attached to the cracker. A battery may also be formed by printing an anode and a cathode directly on the cracker. In this embodiment, the cracker and salt of the cracker function as the dry electrolyte.

Printing the anode and cathode directly onto a food product may reduce the time required for the battery to become active. In this configuration, the battery may be activated with the presence of saliva alone, without chewing or maceration to activate the battery.

Other food products besides crackers may incorporate a battery 100. Examples of other food products that may incorporate a battery 100 include, but are not limited to, breads, candies, caramels, and preserves. Unlike a cracker, that once baked is relatively dry, bread, preserves, caramels, and candies may contain enough moisture to prematurely activate the dry electrolyte before the food product is eaten. To avoid prematurely activating the dry electrolyte, components of the battery 100 may be hermetically or otherwise sealed using a non-conductive coating. In one embodiment illustrated in FIG. 8A, a battery 800 includes an anode 804, a dry electrolyte 806, and a cathode 808. To prevent the dry electrolyte 806 from activating prematurely, the battery 800 is encased in a non-conductive coating 802. In one configuration, the non-conductive coating is waterproof and may be wax. The non-conductive coated battery 800 may then be incorporated into jams, caramels, and candies, for example. The non-conductive coating acts as a barrier that separates the battery from moisture, and prevents the dry electrolyte 806 from prematurely activating. The non-conductive coating also protects the anode 804 and cathode 808 from the moisture contained within the food product. Upon chewing, the non-conductive coating is broken and the dry electrolyte 806 becomes exposed to both the moisture within the food product and the moisture provided by saliva. In another embodiment, a battery 100 includes a non-conductive coating and is designed to be swallowed. Digestion of the battery 100, can result in breaking the non-conductive layer and exposing the battery 100 to biological fluids contained within the digestive system. Upon exposure to moisture, the dry electrolyte 706 is activated and the battery 800 may drive the circuit 200.

In an illustrative embodiment, a battery 800 may be encased in a non-conductive coating 802 by dipping the battery 800 into the non-conductive coating 802. A non-conductive coating may also be applied using a printer. Using wax as the non-conductive coating, a phaser printer, such as a Xerox® 8550, that uses blocks of wax instead of toner to print, may be used to encase a battery 800 or print a layer of wax on the battery 800. The layer of wax may completely cover or encase the anode, cathode, or dry electrolyte, or may only cover a portion of these components. The uses and components of phaser printing are well known to those of skill in the art and are not described in detail herein.

Figure 8B:
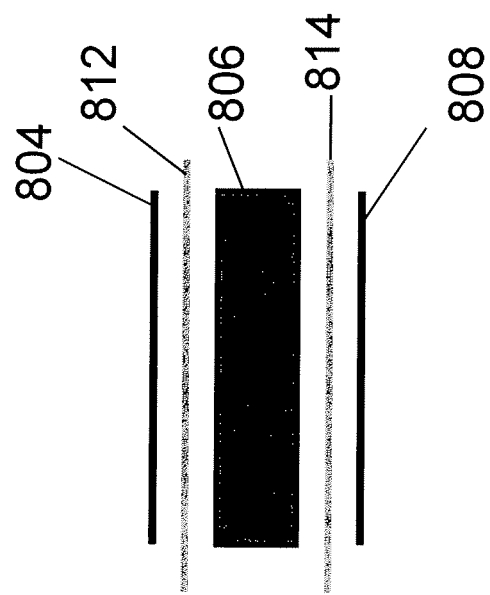
FIG. 8B illustrates a battery with a resistor combined with the dry electrolyte in accordance with an illustrative embodiment.
Figure 8A:
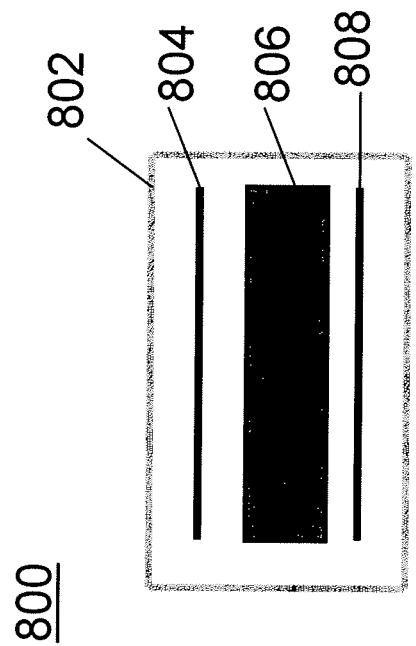
FIG. 8A illustrates a battery containing resistors connected to the anode and cathode in accordance with an illustrative embodiment.

Non-conductive coatings may also be used to separate the anode and cathode from the dry electrolyte. FIG. 8B illustrates such an embodiment. The anode 804 is separated from the dry electrolyte by a non-conductive coating 812. Similarly, the cathode may be separated from the dry electrolyte 806 by a separate non-conductive layer 814. Using a non-conductive layer to separate the anode 804 and cathode 808 from the dry electrolyte 806 allows the anode 804 and cathode 808 to contain small amounts of moisture without prematurely activating the dry electrolyte 806. In other configurations, only one of the anode 804 or cathode 808 is separated from the dry electrolyte 806 by a non-conductive layer. In yet another configuration, the non-conductive layers 812 and 814 completely encase the dry electrolyte 806.

The various configurations of the resistors and non-conductive components may be combined. FIG. 9A illustrates the battery illustrated in FIG. 6A encased in a non-conductive layer 802. FIG. 9B illustrates the battery illustrated in FIG. 6B encased in a non-conductive layer 802, with a non-conductive layer 812 separating the anode 614 and the dry electrolyte 620, and with a non-conductive layer 814 separating the cathode 618 from the dry electrolyte 620. In this configuration, the non-conductive layers 802, 812, and 814 allow the food product, the anode 614, the cathode 616, and the resistors 612 and 618 to contain small amounts of moisture without prematurely activating the dry electrolyte 622.

Numerous embodiments of the battery 100 can be incorporated into various foods. In addition to producing a current, an activated battery can increase the amount of saliva generated in the mouth of a user. Saliva can be produced by the stimulation of either or both the sympathetic nervous system and the parasympathetic nervous system. For example, stimulation of the trigeminal nerve can result in an increase in the secretion and production of saliva. While not intending to be limited by theory, an activated battery 100 may stimulate the trigeminal nerve and/or other nerves of the sympathetic and parasympathetic nervous systems. Accordingly, an activated battery 100 can result in an increase in both saliva production and saliva secretion. In an illustrative embodiment, a battery 100 can be printed on or embedded into a piece of chewing gum. Once the gum is placed in a mouth to be chewed, saliva can activate the battery 100. The activated battery 100 can increase the saliva production and saliva secretion of the user by stimulating the sympathetic nervous system and/or parasympathetic nervous system. Accordingly, a battery 100 can be used to treat such conditions as Xerostomia (e.g., dry mouth) by increasing saliva production and secretion. In another embodiment, a battery 100 can be incorporated into a thin film or dissolvable strip drug delivery mechanism. The current generated by the battery 100 can enhance the absorption of the drug contained within the thin film drug delivery mechanism through stimulation of tissues in the mouth, stomach, and/or small intestines.

EXAMPLES

The present compositions and methods will be understood more readily by reference to the following examples, which are provided by way of illustration and are not intended to be limiting in any way.

Example 1

A Cracker Including an Edible Battery

A battery was constructed by creating a dough by mixing seven cups of sifted flour and 2 tablespoons of salt with ½ ounce of active dried yeast, 4 tablespoons of extra-virgin olive oil, and 2½ cups of lukewarm water. The dough was kneaded until smooth and springy, and then was left to rest for around one hour. The rested dough was rolled very thin, about 0.05 inches. Prior to baking, the dough was placed in an HP840 inkjet printer and a liquid cathode containing copper was printed in a 10 mm by 10 mms square grid on one side of the dough. The dough was then put back in the printer upside down, and a liquid anode containing zinc was printed on the opposite side of the dough in a similar 10 mm by 10 mm square grid. The dough was then baked at 550° Fahrenheit for 7 to 10 minutes.

Example 2

A Caramel Including an Edible Battery

A first and second battery were constructed by printing, using an HP 840 inkjet printer, two cathodes using a liquid cathode containing copper on one side of a sheet of rice paper. The rice paper used was Banh Trang 12 inch rice paper, which is around 0.025 inches in thickness. The rice paper was taken out of its packaging and was partially air dried for a few minutes. Next, the rice paper was placed in the printer, and two liquid anodes containing zinc were printed on the opposite side of the rice paper. The anodes and cathodes were aligned with one another forming the first and second battery with the rice paper acting as the dry electrolyte. The anodes and cathodes were both printed as a 5 mm grid.

The rice paper was then inserted into a Xerox® 8550 phaser printer, and a layer of wax coating was printed to cover the entire first and second sides of the rice paper. The anodes and cathodes, therefore, were also coated with a layer of wax. Next, the first and second battery were cut from the rice paper and connected in series by placing the second battery on top of the first battery, with the anode of the first battery and the cathode of the second battery separated only by the layer of wax.

The two batteries in series were then placed into a caramel. The caramel was cut in half and the batteries were placed in the middle of one half. The caramel was then reformed by pressing the two halves back together.

Example 3

A Jam Including Edible Batteries

A number edible batteries were constructed by printing, using an HP 840 inkjet printer, a cathode using a liquid cathode containing copper on one side of a sheet of rice paper. The rice paper used was Banh Trang 12 inch rice paper, which is around 0.025 inches in thickness. Next, the rice paper was placed in the printer, and a liquid anode containing zinc were printed on the opposite side of the rice paper. The anodes and cathodes were printed such that the anode and cathode covered the relative side of the rice paper.

The rice paper was then inserted into a Xerox® 8550 phaser printer, and a layer of wax coating was printed to cover the entire first and second sides of the rice paper. The anodes and cathodes, therefore, were also coated with a layer of wax. Next, the rice paper was cut to create quarter inch squared batteries. The batteries were then added to a cup of jam. Stirring the jam incorporated the batteries throughout the jam.

Example 4

Treatment of Dry Mouth

A battery embedded in a food product or dissolvable strip can be used as a treatment of dry mouth. Once administered orally, the battery will be activated by at least saliva within a subject's mouth. Upon activation, the battery will increase saliva production and secretion levels compared to the levels prior to the activation and administration of the battery. The battery, therefore, will be useful in treating dry mouth.

Example 5

Muscle Stimulation

A battery can be embedded in a patch that is designed to affix to skin of a subject. At least portions of the battery's anode and cathode can be in contact with the subject's skin when the patch is affixed. Sweat from the subject will be absorbed by the dry electrolyte, and eventually the absorbed sweat will activate the battery. Current from the battery will flow across the subject's skin and will cause the subject's muscles local to the placement of the patch to be stimulated.

Example 6

Breath Strips

A battery can be embedded on an edible, dissolvable strip. The strip will contain breath freshening elements such as mint flavoring. Placing the strip into a subject's mouth causes the battery to activate based upon saliva contained with the subject's mouth. The current produced from the battery will act as an anti-septic and will impede the flora of the subject's mouth.

Example 7

Flavor Enhancement Condiment

A layer of dehydrated potato, acting as a dry separator containing a dry electrolyte, can have an anode layer printed on one side of the potato. The anode layer can cover the one side of the potato. A cathode layer can be printed on an opposite side of the potato to cover the opposite side of the potato. The dehydrated potato can then be separated into a number of small pieces, each of which is a separate edible battery. The batteries can be mixed together with salt, pepper, or other spices, or used independently and sprinkled on food. When the food is eaten, saliva can activate the batteries. The activated batteries increase saliva production and secretion, which can enhance the flavor of the food being eaten.

One or more flow diagrams have been used herein. The use of flow diagrams is not meant to be limiting with respect to the order of operations performed. The herein-described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Specific examples of "operably couplable" include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having"

should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. An apparatus comprising:
   a food product;
   a first battery attached to the food product in an inactive state, the first battery comprising:
   a first food-grade anode;
   a first food-grade cathode; and
   a first food-grade dry electrolyte configured to be activated by saliva to electrically connect the first food-grade anode and the first food-grade cathode to generate an electrical current, wherein a topology of the first food-grade anode is selected based on a dissolution rate of the first food-grade anode, wherein a topology of the first food-grade cathode is selected based on a dissolution rate of the first food-grade cathode, wherein a surface area of the topology of the first food-grade anode on the food product and a surface area of the topology of the first food-grade cathode on the food product are different, and wherein the rate of activation of the first battery is based on the topology of the first food-grade anode and on the topology of the first food-grade cathode; and
   a second battery attached to the food product in an inactive state, the second battery comprising:
   a second food-grade anode;
   a second food-grade cathode; and
   a second food-grade dry electrolyte configured to be activated by saliva to electrically connect the second food-grade anode and the second food-grade cathode to generate an additional electrical current, wherein the first battery is active for a first length of time and the second battery is active for a second length of time, and wherein the first length of time is different than the second length of time.

2. The apparatus of claim 1, wherein the first food-grade anode is at least one of copper, carbon, manganese dioxide, or iron.

3. The apparatus of claim 1, wherein the first food-grade cathode is at least one of zinc or nickel.

4. The apparatus of claim 1, wherein the first food-grade dry electrolyte is at least one of phosphoric acid, ascorbic acid, or salt.

5. The apparatus of claim 1, wherein the second battery is configured to be in series with the first battery.

6. The apparatus of claim 1, further comprising a non-conductive layer, wherein the non-conductive layer encapsulates the first battery, and wherein the first battery is exposed upon maceration of the non-conductive layer in a mouth of a subject.

7. The apparatus of claim 6, wherein the non-conductive layer is one of wax, sucrose, or chocolate.

8. The apparatus of claim 1, wherein the food product is at least one of a cracker, a bread, a candy, a potato chip, or a preserve.

9. The apparatus of claim 1, further comprising a resistor.

10. The apparatus of claim 9, wherein the resistor comprises carbon.

11. The apparatus of claim 1, wherein the electrical current increases production of saliva.

12. The apparatus of claim 1, wherein the electrical current increases secretion of saliva.

13. The apparatus of claim 1, wherein the apparatus comprises a dissolvable strip.

14. The apparatus of claim 13, wherein the dissolvable strip comprises a breath freshener.

15. The apparatus of claim 14, wherein the electrical current is configured to reduce the flora of a mouth.

16. The apparatus of claim 13, wherein the electrical current is configured to combat gum disease.

17. A method comprising:
   printing a first food-grade anode on a food product in an inactive state;
   printing a first food-grade cathode on the food product in an inactive state, wherein the food product comprises a food-grade dry electrolyte that is activated by a first biological fluid, wherein the activated food-grade dry electrolyte electrically connects the first food-grade anode and the first food-grade cathode to generate a first electrical current, wherein a topology of the first food-grade anode is selected based on a dissolution rate of the first food-grade anode, wherein a topology of the first food-grade cathode is selected based on a dissolution rate of the first food-grade cathode, wherein a surface area of the topology of the first food-grade anode on the food product and a surface area of the topology of the first food-grade cathode on the food product are different, and wherein the rate of activation of the first battery is based on the topology of the first food-grade anode and on the topology of the first food-grade cathode;

printing a second food-grade anode on the food product; and printing a second food-grade cathode on the food product, wherein the activated food-grade dry electrolyte electrically connects the second food-grade anode and the second food-grade cathode to generate a second electrical current, wherein the first electrical current is generated for a first length of time and the second electrical current is generated for a second length of time, and wherein the first length of time is different from the second length of time.

18. The method of claim 17, wherein the second food-grade anode and the second food-grade cathode are configured to be in series with the first food-grade anode and the first food-grade cathode.

19. The method of claim 17, further comprising encapsulating the dry separator with a non-conductive layer.

20. The method of claim 17, wherein printing the food-grade anode comprises printing the food-grade anode as a grid.

21. The method of claim 17, wherein printing the food-grade cathode comprises printing the food-grade cathode as a grid.

22. The method of claim 17, further comprising printing a resistor.

23. The apparatus of claim 1, wherein the first food-grade cathode comprises a grid on the food product, and wherein the food-grade anode comprises a solid quadrangle on the food product.

* * * * *

UNITED STATES PATENT AND TRADEMARK OFFICE
CERTIFICATE OF CORRECTION

PATENT NO.         : 8,722,228 B2                                              Page 1 of 1
APPLICATION NO.    : 13/260446
DATED              : May 13, 2014
INVENTOR(S)        : Godden It is certified that error appears in the above-identified patent and that said Letters Patent is hereby corrected as shown below:

On Title Page 2, in item (56), under "FOREIGN PATENT DOCUMENTS", in Column 2, Line 1, delete "2/2009" and insert -- 5/2009 --, therefor.

In the Specification

In Column 6, Line 16, delete "cathode 120" and insert -- cathode 130 --, therefor.

In Column 8, Lines 66-67, delete "cathode 120." and insert -- cathode 130. --, therefor.

In Column 14, Line 3, delete "cathode 618" and insert -- cathode 616 --, therefor.

Signed and Sealed this
Sixteenth Day of September, 2014

Michelle K. Lee
*Deputy Director of the United States Patent and Trademark Office*